United States Patent [19]

Kanno et al.

[11] Patent Number: 4,691,236
[45] Date of Patent: Sep. 1, 1987

[54] RECEIVER DEVICE IN A SATELLITE COMMUNICATION SYSTEM

[75] Inventors: Masayoshi Kanno, Tokyo; Yasuhiro Hideshima, Saitama; Shinobu Tsurumaru; Ikuo Kanayama, both of Kanagawa, all of Japan

[73] Assignee: Sony Corporation, Tokyo, Japan

[21] Appl. No.: 771,229

[22] Filed: Aug. 30, 1985

[30] Foreign Application Priority Data

Aug. 31, 1984 [JP] Japan .............................. 59-182411
Aug. 31, 1984 [JP] Japan .............................. 59-182414

[51] Int. Cl.$^4$ ........................ H04N 5/262; H04N 5/44
[52] U.S. Cl. .................................. 358/181; 358/189; 358/197; 358/198
[58] Field of Search ................. 358/189, 181, 197, 198

[56] References Cited

U.S. PATENT DOCUMENTS 4,097,899  6/1978  Yu ........................................ 358/181
4,272,788  6/1981  Ogita .................................... 358/189
4,329,675  5/1982  Van Hulle ........................... 358/181

Primary Examiner—James J. Groody
Assistant Examiner—Michael D. Parker
Attorney, Agent, or Firm—Hill, Van Santen, Steadman & Simpson

[57] ABSTRACT

A receiver device for a satellite communication system capable of transmitting in either of two modes detects which transmission mode is currently in effect and adjusts its signal processing and output stages accordingly. The transmission may be recognized by reference to either the encoded information or the electromagnetic medium itself of the received electromagnetic transmissions. In one mode, only audio signals and related information are broadcast in FM form whereas in the other mode, a video image signal is also included, while a subcarrier signal is modulated by an audio and/or a data signal. The receiver system checks either the sub-carrier signal or video synchronization signals in the incoming transmissions to determine the transmission mode. The receiver may also be forced to a predetermined mode upon power-up to prevent spurious mode-selection errors.

7 Claims, 8 Drawing Figures

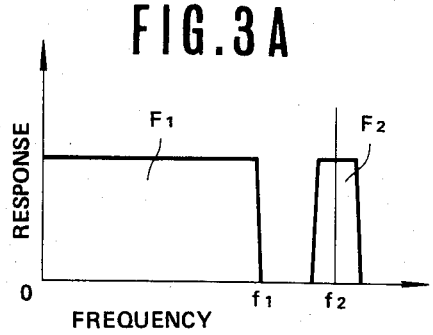
FIG.3A
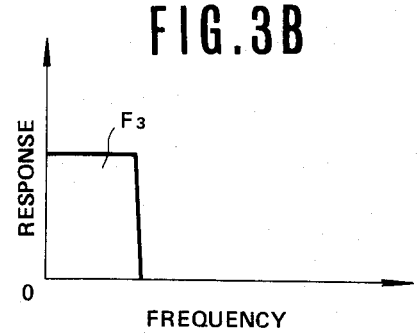
FIG.3B
FIG.4
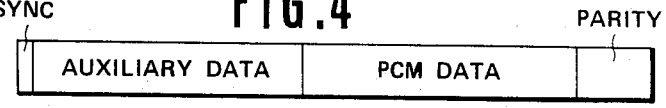
FIG.6
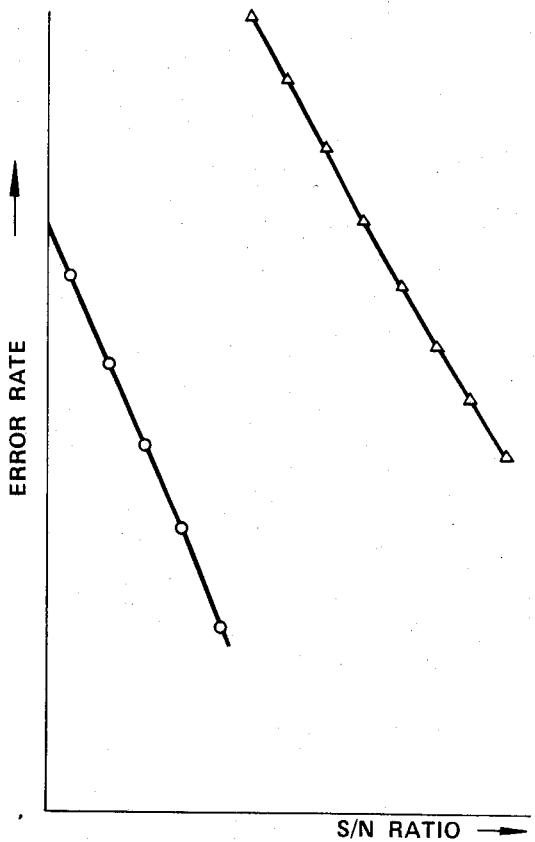
FIG.5
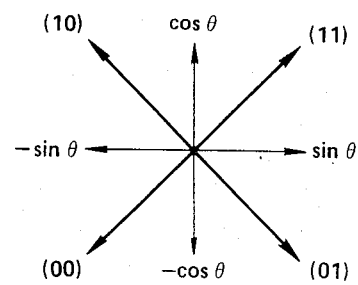

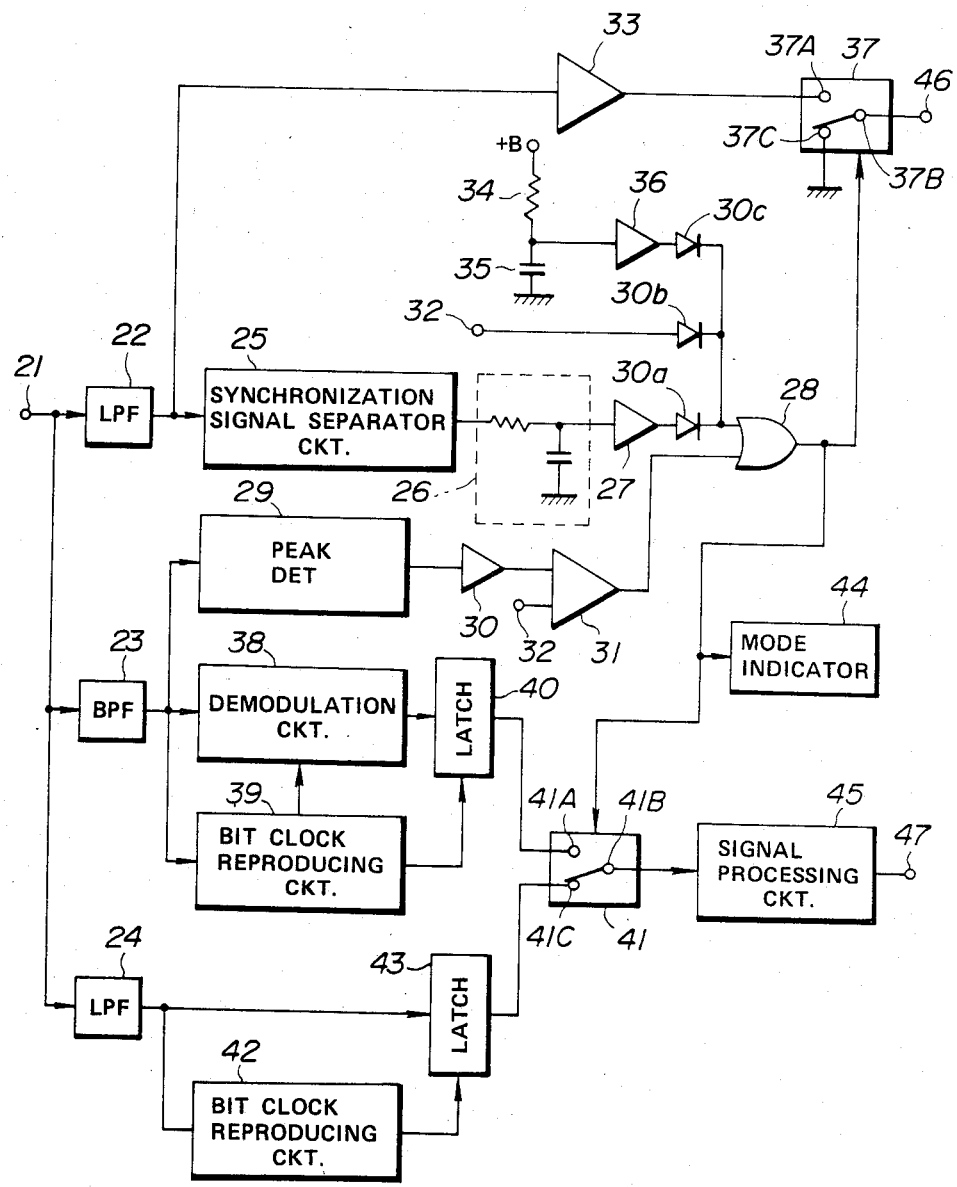

RECEIVER DEVICE IN A SATELLITE COMMUNICATION SYSTEM

BACKGROUND OF THE INVENTION

1. Field of the Invention

The present invention relates generally to a receiver device suitable for receiving information transmitted over a satellite communication system. More particularly, the invention relates to a satellite communication system including a receiver device which ensures at least a minimum amount of data transmission even under unfavorable atmospheric conditions.

2. Description of the Prior Art

In the recent years, information transmission by means of satellite communication systems has become popular due to their speed and extensive range. Such satellite communication systems are known to be advantageous for transmitting information, such as video signals audio signals, data signals and so forth, to stations world-wide.

In satellite communication systems, information is converted into electromagnetic signals and transmitted to an artificial satellite from a transmitting station. The electromagnetic signals are modulated at a predetermined frequency and amplified for direct reception at receiving stations. Then, the signal are transmitted or distributed from the artificial satellite to the receiving stations. The electromagnetic signals used in satellite communication systems are sub-millimeter wave in the super-high frequency band. A super-high frequency signal is subject to significant absorption by mist, rain or so forth due to the short wavelength. Therefore, in conventional satellite communication systems, S/N ration decreases during heavy rain and other severe weather. In the worst case, transmitted information may be completely lost in the noise.

The present invention is intended to adapt receive devices for use in dual-mode data transmission systems.

OBJECT AND SUMMARY OF THE INVENTION

Object of the Invention

It is an object of the invention to provide a receiver device applicable to dual-mode satellite communication system and which recognizes the current transmission mode and selects its reception mode accordingly.

Another object of the invention is to provide a receiver device which is able to distinguish between transmission modes in dual-transmission-mode satellite communication systems even when the S/N ratio is relatively low.

Summary of the Invention

There have been various attempts to resolve this problem in the conventional art. In one approach, variable-mode data transmission has been attempted. In variable-mode data transmission, data can be transmitted either in a normal mode, which is used under relatively favorable atmospheric conditions and will be referred to hereafter as "clear-sky mode", or another mode, which is affected by atmospheric conditions to a lesser extent and thus ensures at least minimum data transmission, and will be referred to hereafter as "save mode".

In this variable-mode data transmission system, receiving stations are required to recognize the current transmission mode and switch the receiver mode accordingly.

In order to accomplish the above-mentioned and other objects, a receiver device in a satellite communication system, according to the invention, is provided with a detector for detecting a sub-carrier frequency in addition to a detector for detecting a synchronization signal. The receiver device is operable in a clear-sky mode when either the synchronization signal or the sub-carrier can be detected. Alternatively, when neither the synchronization signal nor the sub-carrier can be detected, the receiver is switched to a save mode.

In accordance with one aspect of the invention, there is provided a receiver device in a satellite communication system for transmitting data through an artificial satellite in either of two transmission modes, in a first of which a video signal and a subcarrier signal which is modulated by an audio and/or data signals is transmitted in the form of an FM modulated signal, and in a second of which an audio and/or data signal is FM modulated and transmitted alone, the receiver device comprising by a demodulation means for demodulating transmitted FM modulated signals into audio and/or data signals, first means for deriving the audio and/or data signal transmitted in the first mode, second means for deriving the audio and/or the data signal transmitted in the second mode, switching means, associated with the first and second means, for selectively deriving one of the output of the first and second means, and a detector means for detecting the first mode, the detector producing a detector signal for operating the switching means to derive the output of the first means when the first data transmission mode from the satellite is detected.

According to the invention set forth above, the synchronization signal detector and/or the sub-carrier detector are provided in the receiver device to assure receiver mode selection corresponding to transmission modes in a dual-mode transmission system. In the clear-sky mode, a video signal and a sub-carrier, 4-phase PSK modulated by audio and/or data signals are received. In the save mode, an FM modulated audio and/or data signal is received. Switching between clear-sky mode and save mode is controlled by detecting the sub-carrier and/or the synchronization signals which are included in the video signal. This enables the receiver device to switch reception modes between the clear-sky mode and the save mode.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and undedrstanding only.

In the drawings:

FIGS. 3A and 3B illustrate the relationship between frequency and response in clear-sky mode and save mode, respectively;

FIG. 4 is a diagram of the data structure of signals transmitted in save mode;

FIG. 5 is a diagram explaining 4-phase PSK modulation;

FIG. 6 is a graph of sensitivity in clear-sky mode and save mode; and

FIG. 7 is a block diagram of the major part of the second embodiment of the receiver device according to the invention.

DESCRIPTION OF THE PREFERRED EMBODIMENT

Figure 1:
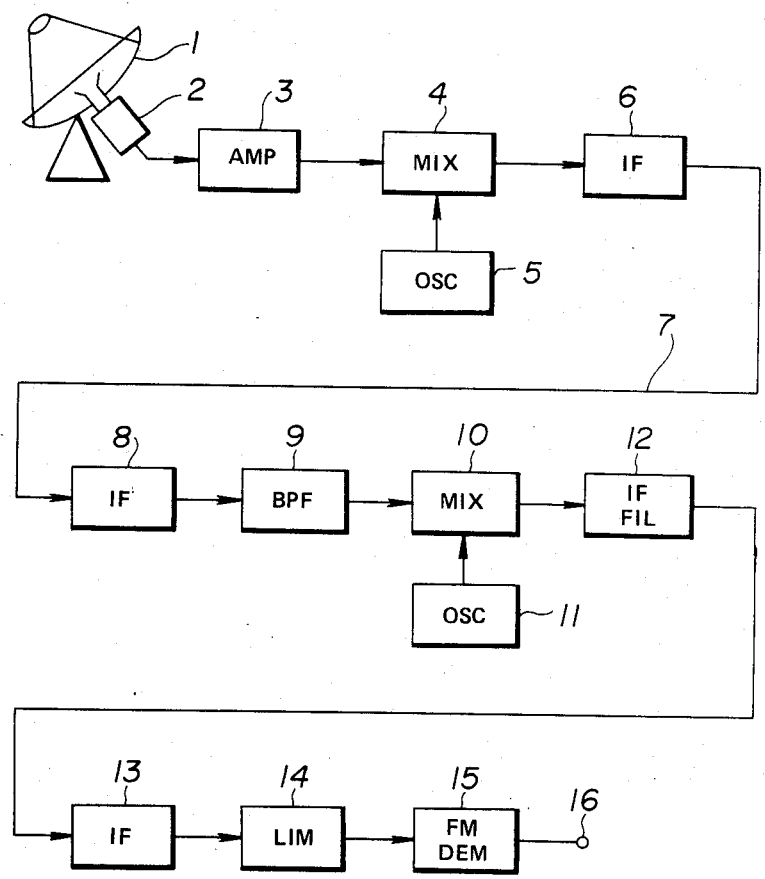
FIG. 1 is a schematic block diagram of the overall arrangement of a receiver device to which the preferred embodiments of reception mode selection according to the invention are applicable.

In order to facilitate better understanding of the preferred embodiments of a receiver device according to the present invention, the general concepts and operation of a dual-mode satellite communication system will be briefly described herebelow before discussing the preferred embodiments of the invention.

In dual-mode satellite communication systems, the transmission mode is selected to be either a clear-sky mode in which image signals, audio signals and data signals are transmitted to the receiver device, or a save mode in which only audio signals and data signals are transmitted. As will be appreciated from FIGS. 3A and 3B, both image signal $F_1$ and 4-phase PSK modulated audio and data signals $F_2$ are transmitted in the clear-sky mode. On the other hand, in the save mode, audio signals and data signals $F_3$ are transmitted in the 2 MHz band.

In more detail, the image signal $F_1$ transmitted in the clear-sky mode is a color-video signal with maximum modulation frequency $f_1$ of approximately 4.5 MHz. On the other hand, the audio signal is a 2-channel, pulse-code-modulated signal with 16 bits of information per channel. The sampling frequency $f_s$ of the audio signal is 48 KHz. This pulse-code-modulated audio signal is augmented with axuiliary alphanumeric data which will be referred to hereafter as "data" or "auxiliary data". The auxiliary data is encoded in the audio signal data in the manner shown in FIG. 4. The auxiliary data packet may include 24 bits, for example. The save mode data signal also include synchronization bit and 7 parity bits.

The audio and auxiliary data signal is 4-phase PSK modulated on the 5.727 MHz sub-carrier wave.

4-phase PS modulation is performed by dividing data into blocks of 2 bits of data each. The four possible binary permutations are then encoded in two trigonometric terms of phase shift to the carrier, as shown in FIG. 5. In practice, when the data value is (1 1), the sine-wave signal phase may be $(\sin \theta + \cos \theta)$, when data value is (1 0), signal phase of the sine-wave signal is $(\cos \theta - \sin \theta)$, when the data value is (0 1), the signal phase of the sine-wave signal is $(\sin \theta - \cos \theta)$ and when the data value is (0 0), the signal phase is $(-\sin \theta - \cos \theta)$.

In the save mode, 4-phase PSK modulation is not performed. The audio and data signal $F_2$ are simply FM modulated for transmission.

When the satellite transmission is working in the clear-sky mode, the combined image signal $F_1$ and 4-phase PSK modulated audio and data signal $F_2$ are FM modulated. The transmitting station converts the combined FM modulated signal to a frequency of 14 GHz, for example, and transmits it to the articifical satellite. On the other hand, in the save mode, FM modulated audio and data signals as frequency-converted to 14 GHz and transmitted to the artificial satellite.

The satellite receives the transmitted 14-GHz signal and converts the signal into a 12-GHz signal. The satellite transmits the frequency-converted 12-GHz signal to the receiving stations via an amplifier which amplifies the transmitting signal sufficiently to allow the receiving stations to receive the transmitted signal directly.

In the save mode, since only the audio signal data and the auxiliary data are transmitted, less power is required than in the clear-sky mode, in which electric power for transmission of the image data is also required. In addition, the transmission band in the same mode is narrower than in the clear-sky mode. As a result, triangular noise due to FM modulation will be suprressed. Therefore, as shown in FIG. 6, the error rate in audio signal data and auxiliary data transmission can be reduced even when the S/N ratio is relatively low. In FIG. 6, the horizontal axis represents the S/N ratio of the received signal and the vertical axis represents the error rate. The curve outlined in triangular marks shows the error rate in clear-sky mode and the curve with circular marks shows the error rate in save mode. As will be appreciated from FIG. 6, since the error rate in the save mode is significantly lower than in the clear-sky mode, information transmission can be performed in the save mode even under bad atmospheric conditions in which data transmission in clear-sky mode would be difficult or impossible.

Figure 2:
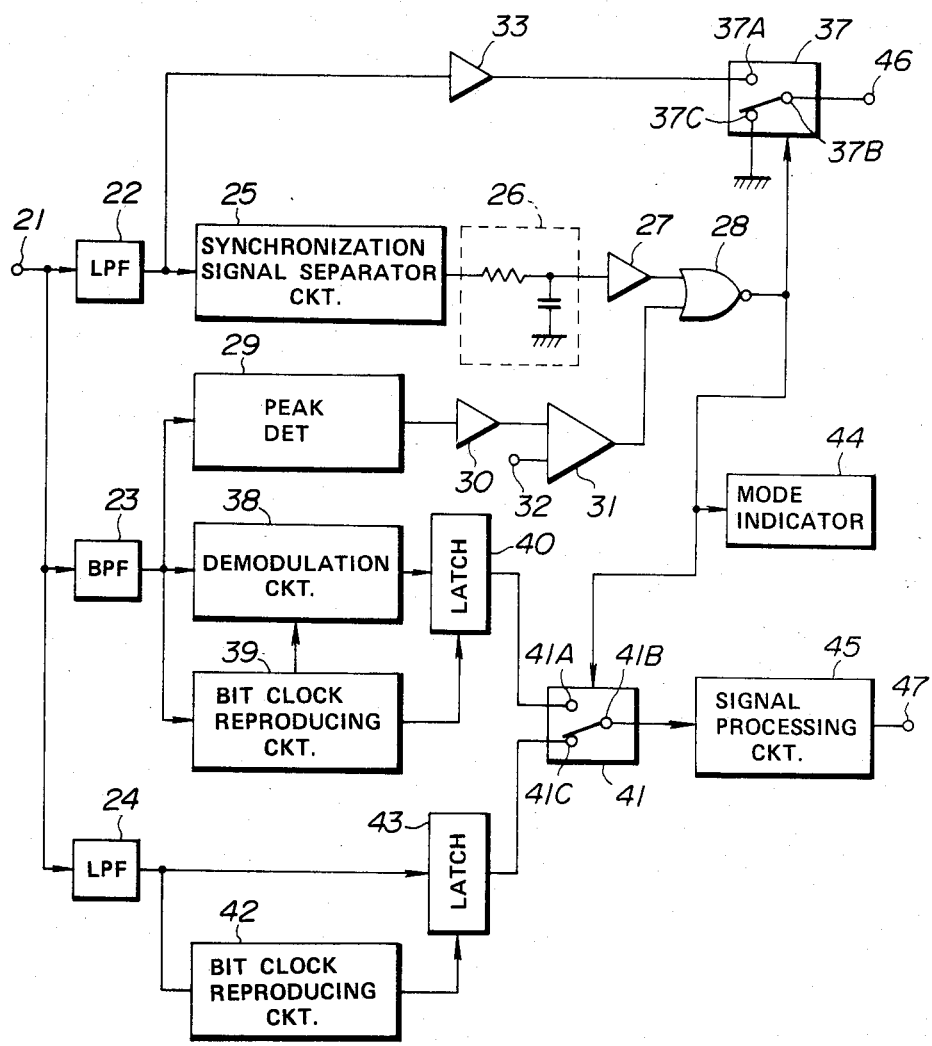
FIG. 2 is a block diagram of the major part of the receiver device performing mode selection in the first embodiment of the receiver device according to the invention.

Referring now to the drawings, particularly FIGS. 1 and 2, the satellite information receiver system includes an antenna 1 which comprises a main reflector, an auxiliary reflector and an electromagnetic horn. A circular polarized wave converter 2 is connected to the electromagnetic horn in the antenna 1.

The circular polarized wave converter 2 has a dielectric disposed within a cylindrical waveguide canted at an angle 45° with respect to plane of polarization of a plane-polarized wave. The circular polarized wave converter 2 receives the circular polarized wave transmitted by an artificial satellite (not shown) through antenna 1 and converts the received circular polarized wave into a plane-polarized wave. The circular polarized wave converter 2 is connected to a super-high frequency amplifier 3 via a rectangular waveguide, a coaxial cable and a converter (not shown). The super-high frequency amplifier 3 is, in turn, connected for output of an amplified signal to a mixer 4.

A first local oscillator 5 is connected for output of a local frequency signal to the mixer 4. The mixer 4 outputs a first intermediate frequency signal created by mixing the first local frequency signal and the plane-polarized signal from the super-high frequency amplifier 3. The mixer 4 feeds the first intermediate frequency signal to a first intermediate wave amplifier 6.

In practice, the antenna 1, the circular polarized wave converter 2, the super-high frequency amplifier 3, the mixer 4, the first local oscillator 5 and the first intermediate frequency amplifier 6 will be installed outdoors at the receiving station. The first intermediate frequency amplifier 6 is connected to another first intermediate frequency amplifier 8 which is included in an ondoor unit, via a coaxial cable 7. The output of the first intermediate frequency amplifier 8 is connected to a variable band-pass filter 9. The variable band-pass filter 9 is designed to selectively pass a desired narrow frequency band to a mixer 10. The mixer 10 is also connected for input from a second local oscillator 11 to receive a local frequency signal. The mixer 10 mixes the desired signal passed by the variable band-pass filter 9 with the local frequency signal from the second local oscillator 11 to produce a second intermediate frequency signal. The mixer 10 feeds the second intermediate frequency signal to a second intermediate frequency bandpass filter 12 and then a second intermediate frequency amplifier 13 and a limiter 14. The output of the limiter 14 is connected to an FM demodulator 15. The FM demodulator 15 comprises a PLL demodulator loop filter characteristics adjustable according to the transmission mode. The FM-demodulated output of the FM demodulator 15 is output through an output terminal 16.

FIG. 2 shows the first embodiment of a mode selection circuit according to the present invention. An input terminal 21 is connected to the output terminal 16 in FIG. 1 and to low-pass filters 22 and 24, and a band-pass filter 23. The low-pass filter 22 has a cut-off frequency of, e.g. 4.5 MHz, designed to pass the image signal $F_1$ to be transmitted in the clear-sky mode. The band-pass filter 23 is designed to pass a frequency band centered at about 5.727 MHz to pass the 4-phase PSK modulated audio signal and data signal $F_2$. The low-pass filter 24 has a cut-off frequency of e.g. 2 MHz so as to pass the audio signal and data signal $F_3$ to be transmitted in the save mode.

The low-pass filter 22 is connected to a synchronization signal separator circuit 25 and also to a buffer amplifier 33. The output of the buffer amplifier 33 is connected to a switching circuit 37. The output of the synchronization signal separator circuit 25 is connected to a buffer amplifier 27 via a noise-suppression integrator circuit 26. The output of the buffer amplifier 27 is connected to one input of a NOR gate 28.

The band-pass filter 23 is connected for output to a bit-clock reproduction circuit, a demodulation circuit 38 and a peak detector 29, the output of the last of which is connected to the non-inverting input of a comparator 31 via an amplifier 30. The other input terminal (inverting terminal) of the comparator 31 is connected for input from a reference voltage source 32 to receive a reference voltage. The output of the comparator 31 is connected to the other input of the NOR gate 28. The NOR gate 28 is connected for output to the control terminal of the switching circujit 37. The switching circuit 37 includes a movable switching element 37B movable between two stationary terminals, 37A, which is connected to the buffer amplifier 33, and 37C, which is connected to ground. The NOR gate 28 is also connected for output to the control terminal of a switching circuit 41 which has a movable switching element 41B switching between two stationary terminals, 41A, which is connected to a latching circuit 40 connected in turn, to the demodulation circuit 38 and a stationary terminal 41C which is connected to a latching circuit 43. The latching circuit 43 is connected for input from the low-pass filter 24.

The latching circuit 40 is connected for input from a bit clock reproducing circuit 39. Similarly, the latching circuit 43 also receives inputs from a bit clock reproducing circuit 42. The bit clock reproducing circuits 39 and 42 designed to receive the audio and data signals $F_2$ and $F_3$ passing through the corresponding band-pass filter 23 and the low-pass filter 24 respectively, count the encoded bits and signal the corresponding latches 40 and 43 to sample and hold the signal information.

A mode indicator 44 is also connected for input from the NOR gate 28 to indicate which operating mode of the receiver device is current depending upon the output level of the NOR gate 28. In addition, although the drawings do not clearly show, the output of the NOR gate 28 is also connected to the FM demodulator 15 to serve as a switching signal of the PLL filter.

As set forth above, the image signal is transmitted from the satellite to the receiver devices only in the clear-sky mode. Thus, synchronization signals will be resolved by the synchronization signal separator circuit 25 only when data transmission is being carried out in the clear-sky mode. When information transmission is performed in the clear-sky mode, the input level at one of the input terminals of the NOR gate 28 will go HIGH due to the HIGH-level output of the synchronization signal separator circuit 25. At the same time, the sub-carrier is 4-phase PSK modulated by the audio signal and the data signal in the clear-sky mode. On the other hand, in the save mode, only the audio signal and the data signal are FM modulated and transmitted. Therefore, amplitude of the sub-carrier will boost the output of the peak detector 29 only in the clear-sky mode. The reference signal from the reference signal generator 32 is selected to be smaller than the output of the buffer amplifier 30 in the presence of the sub-carrier and greater than the output of the buffer amplifier 30 otherwise. As a result, the output of the comparator 31 goes HIGH only in the clear-sky mode.

The NOR gate output normally remains HIGH and goes LOW in response to a HIGH-level input at either or both of its input terminals. This means that when the output of the synchronization signal separator circuit 25 and/or the output of the comparator 31 are HIGH, the output of the NOR gate 28 becomes high and the clear-sky mode data transmission is recognized.

The switching element 37B of the switching circuit 37 is normally held in contact with the stationary terminal 37C to disconnect the low-pass filter 22 from the output terminal 46. In response to a LOW-level output from the NOR gate 28, the switching element 37B switches into contact with the stationary terminal 37A to connect the low-pass filter 22 to the output terminal. In this condition, the video signal passed through the low-pass filter 22 passes through the output terminal 46.

As long as the output of the NOR gate 28 remains HIGH, the mode indicator 44 continues to indicate save mode data transmission. The mode indicator 44 indicates the clear sky mode, when the output of the NOR gate 28 is LOW-level. In practice, the mode indiciator 44 may indicate the data transmission mode in an ON/OFF manner. For example, the mode indicator 44 may remain ON as long as the output of the NOR gate 28 remain HIGH and goes OFF when the output of the NOR gate goes LOW.

Similarly, the switching element 41B of the switching circuit is normally held in the position in which it connects the latching circuit 43 to a signal processing circuit 45 which performs per se well-known signal processing operations such as error correction and so forth. The switching circuit 41 is responsive to a LOW-level input from the NOR gate 28 to switch the switching element 41B into contact with the stationary terminal 41A so as to connect the latching circuit 40 to the signal processing circuit 45.

Therefore, when the transmission is performed in the clear-sky mode, the video signal F1 passed through the low-pass filter 22 is amplified by the amplifier 33 and passes through the switching circuit 37, in which the switching element 37B is held in contact with the stationary terminal 37A, to the output terminal 46. At the same time, the audio signal and the data signal F2 transmitted in the form of a 4-phase PSK modulated signal, passes through the band pass filter 23. The audio signal and the data signal F2 is fed to the demodulator 38 and to the bit clock generator 39. The bit clock generator 39 feeds its output to the demodulator 38. The demodulator 38 performs 4-phase PSK demodulation and feeds its output to the latching circuit 40. the latching circuit 40 is, in turn, connected to the bit clock eproducing circuit 39 to receive the bit clock. The latching circuit 40 retains the pulse code modulated audio data and auxiliary data for output to the signal processing circuit 45 through the switching circuit 41, in which the switching element 41B is held in contact with the stationary terminal 41A.

Although it has not been clearly illustrated in the drawings, the pulse code modulated audio data and the auxiliary data are separated in a per se well-known manner. After separaton from the auxiliary data, the pulse code modulated audio data is converted into an analog audio signal for audio reproduction.

When data transmission is performed in the save mode, the output of the NOR gate 28 remains HIGH. Therefore, as set forth above, the switching circuit 37 disconnects the low-pass filter 22 from the output terminal 46. On the other hand, the switching element 41B of the switching circuit 41 is moved into contact with the stationary terminal 41C to connect the latching circuit 43 to the signal processing circuit 45. The latching circuit 43 is, in turn, connected to the low-pass filter 24. The bit clock reproducing circuit 42 is also connected to the low-pass filter 24 to receive the FM modulated audio and data signals and feeds the bit clock to the latching circuit 43. Similarly to the above, the pulse code modulated audio data and the auxiliary data are held for later outputs by the latching circuit 43. In this case, since the switching element 41B of the switching circuit 41 is in contact with the stationary terminal 41A in response to a LOW-level output from the NOR gate 28, the output of the latching circuit 40 is input to the signal processing circuit 45 and then, output through the output terminal 47.

FIG. 7 shows the second embodiment of the receiver device according to the present invention. Elements in the second embodiment of the receiver device which have already been disclosed with reference to the foregoing first embodiment and which operate in essentially the same manner as disclosed above will be referred to by the same reference numerals. In this embodiment, the receiver device operates in clear-sky mode during an antenna setting operation by which direction of antenna of the receiver is adjusted so as to find the best antenna position for highest sensitivity.

Referring to FIG. 7, a diode 30a is inserted between the buffer amplifier 27 and the NOR gate 28. The cathode of the diode 30a is connected in common with the cathodes of diodes 30b and 30c. The commonly connected cathodes of the diodes 30a, 30b and 30c are connected to one input terminal of the NOR gate 28. The diodes 30a, 30b and 30c function as an OR gate.

A terminal 32 receives a command for antenna setting operation, which command is produced and transmitted at a per se well-known timing and in a well-known manner. As set forth, during the antenna setting operation mode, the antenna 1 of FIG. 1 is driven to change directions in order to find the best direction for optimum sensitivity. The antenna setting operation command is HIGH when the direction of antenna 1 is to be adjusted. During the antenna setting operation, the antenna scans the transmitted signal levels in every direction. The input signal level at the antenna 1 is displayed on a video monitor screen, e.g. CRT, (not shown) in the form of a bar graph. Since the antenna setting operation mode command HIGH, the input at the anode of the diode 30b goes HIGH. Therefore, the input level of the NOR gate 28 is HIGH, turning the output of the NOR gate 28 LOW.

The anode of the diode 30c is connected to a power source terminal +B via a resistor 34 and an inverter 36. The power source terminal +B is, in turn, connected to ground via the resistor 34 and a capacitor 35. The junction between the resistor 34 and the capacitor 35 is connected to the input terminal of the inverter 36. When power supply is started, the capacitor 35 is at first charged to a predetermined potential. During this period in which the potential of the capacitor 5 is lower than the predetermined potential, the input level at the input terminal of the inverter 36 remains LOW. Therefore, the output of the inverter 36 applied to the anode of the diode 30c remains HIGH. Thus, the diode 30c sends a HIGH-level output to the NOR gate 28 to turn the output level of the latter LOW. In practice, the time constant of the capacitor 35 may be set to about 2 or 3 sec.

As will be appreciated herefrom, according to the second embodiment of the receiver device of the invention, the receiver device operates in the clear-sky mode during the antenna setting operation mode and during a given period which is defined by the time constant of the capacitor 35. The latter prevents erroneous selection of the save mode due to excessively low initial power levels, which would also adversely effect the synchronization signal separator circuit 25 and the peak detector 29.

According to the present invention, selection between the clear-sky mode and the save mode can be performed accurately in order to avoid an unfavorable S/N ratio. Furthermore, performing satellite transmission in dual-mode, i.e. clear-sky mode and save mode, ensures transmission of a minimum of data even when atmospheric conditions are unfavorable.

Although specific embodiments of the invention have been disclosed hereabove for fully disclosing the invention, the invention should not be mistaken to be limited to the specific embodiments. All of the possible embodiments and modifications of the shown embodiments should be regarded within a scope of the invention as set out in the appended claims.

What is claimed is:

1. A receiver device in a satellite communication system for transmitting information through an artificial satellite in either of two transmission modes, in a first of which a video signal including synchronization signals and a subcarrier signal which is modulated by an audio and/or data signal are transmitted in the form of an FM modulated signal, and in a second of which an FM modulated audio and/or data signal is transmitted alone, the receiver device comprising:

demodulation means for demodulating transmitted FM modulated signals;

first means for deriving said audio and/or said data signal transmitted in said first mode;

second means for deriving said audio and/or said data signal transmitted in said second mode;

switching means, associated with said first and second means, for selectively deriving one of the output of said first and second means; and detector means for detecting said first mode, said detector means producing a detector signal for operating said switching means to derive the output from said first means when said first data transmission mode from said satellite is detected.

2. A receiver device as set forth in claim 1, in which said detector means detects said synchronization signals in said video signal.

3. A receiver device in a satellite communication system for transmitting information through an artificial satellite in either of two transmission modes, in a first of which a video signal including synchronization signals and a subcarrier signal which is modulated by an audio and/or data signal are transmitted in the form of an FM modulated signal, and in a second of which an FM modulated audio and/or data signal is transmitted alone, the receiver device comprising: demodulation means for demodulating transmitted FM modulated signals; first means for deriving said audio and/or data signal transmitted in said first mode; second means for deriving said audio and/or said data signal transmitted in said second mode; switching means, associated with said first and second means, for selectively deriving one of the output of said first and second means; detector means for detecting said first mode, said detector means producing a detector signal for operating said switching means to derive the output from said first means when said first data transmission mode from said satellite is detected, and, in which said detector means detects said subcarrier signal.

4. A receiver device in a satellite communication system for transmitting information through an artificical satellite in either of two transmission modes, in a first of which a video signal including synchronization signals and a subcarrier signal which is modulated by an audio and/or data signal are transmitted in the form of an FM modulated signal,land in a second of which an FM modulated audio and/or data signal is transmitted alone, the receiver device comprising: demodulation means for demodulating transmitted FM modulated signals; first means for deriving said audio and/or data signal transmitted in said first mode; second means for deriving said audio and/or said data signal transmitted in said second mode; switching means, associated with said first and second means, for selectively deriving one of the output of said first and second means; detector means for detecting said first mode, said detector means producing a detector signal for operating said switching means to derive the output from said first means when said first data transmission mode from said satellite is detected, and, in which said detector means detects said synchronization signal in said video signal and said subcarrier signal in said first mode.

5. A receiver device in a satellite communication system for transmitting information through an articifical satellite in either of two transmission modes, in a first of which a video signal including synchronization signals and a subcarrier signal which is modulated by an audio and/or data signal are transmitted n the form of an FM modulated signal, and in a second of which an FM modulated audio and/or data signal is transmitted alone, the receiver device comprising: demodulation means for demodulating transmitted FM modulated signals; frist means for deriving said audio and/or data signal transmitted in said first mode; second means for deriving said audio and/or said data signal transmitted in said second mode; switching means, associated with said first and second means, for selectively deriving one of the output of said first and second means; detector means for detecting said first mode, said detector means producing a detector signal for operating said switching means to derive the output from said first means when said first data transmission mode from said satellite is detected; and, in which said switching means derives the output of said first means by a command signal ordering adjustment of an antenna to the direction at which the best sensitivity is obtained in said first mode.

6. A receiver device as set forth in claim 1, in which said switching means is responsive to the onset of power supply to enable said first means.

7. A receiver device in a satellite comunication system for transmitting information through an artificial satellite in either of two transmission modes, in a first of which a video signal including synchronization signals and a subcarrier signal which is modulated by an audio and/or data signal are transmitted in the form of an FM modulated signal, and in a second of which an FM modulated audio and/or data signal is transmitted alone, the receiver device comprising: demodulation means for demodulating transmitted FM modulated signals; first means for deriving said audio and/or data signal transmitted in said first mode; second means for deriving said audio and/or said data signal transmitted in said second mode; switching means, associated with said first and second means, for selectively deriving one of the output of said first and second means; detector means for detecting said first mode, said detector means producing a detector signal for operating said switching means to derive the output from said first means when said first data transmission mode from said satellite is detected, in which said switching means is responsive to the onset of power supply to enable said first means, and, in which said switching means derives the output of said first means for a given period of time after the onset of power supply regardless of transmission mode of said satellite communication system.

* * * * *